United States Patent
Xia et al.

(10) Patent No.: US 7,072,392 B2
(45) Date of Patent: Jul. 4, 2006

(54) EQUALIZER FOR TIME DOMAIN SIGNAL PROCESSING

(75) Inventors: Jingsong Xia, Mundelein, IL (US); Richard W. Citta, Oak Park, IL (US); Scott M. LoPresto, Mount Prospect, IL (US); Wenjun Zhang, Shanghai (CN)

(73) Assignee: Micronas Semiconductors, Inc., Palatine, IL (US)

( * ) Notice: Subject to any disclaimer, the term of this patent is extended or adjusted under 35 U.S.C. 154(b) by 717 days.

(21) Appl. No.: 10/007,999

(22) Filed: Nov. 13, 2001

(65) Prior Publication Data

US 2002/0097795 A1    Jul. 25, 2002

Related U.S. Application Data

(60) Provisional application No. 60/248,180, filed on Nov. 13, 2000.

(51) Int. Cl.
 *H03H 7/30* (2006.01)
(52) U.S. Cl. .................. 375/233; 375/152; 375/231; 375/229; 375/232; 375/265; 375/341; 375/348
(58) Field of Classification Search ............... 375/150, 375/152, 229, 231, 262, 265, 348, 233, 232, 375/341
See application file for complete search history.

(56) References Cited

U.S. PATENT DOCUMENTS

| | | |
|---|---|---|
| 4,567,599 A | 1/1986 | Mizoguchi |
| 4,712,221 A | 12/1987 | Pearce et al. |
| 4,815,103 A | 3/1989 | Cupo et al. |
| 4,833,693 A | 5/1989 | Eyuboglu |
| 4,856,031 A | 8/1989 | Goldstein |
| 4,866,395 A | 9/1989 | Hostetter |
| 4,989,090 A | 1/1991 | Campbell et al. |
| 5,052,000 A | 9/1991 | Wang et al. |
| 5,056,117 A | 10/1991 | Gitlin et al. |
| 5,058,047 A | 10/1991 | Chung |
| 5,127,051 A * | 6/1992 | Chan et al. ............. 375/348 |
| 5,134,480 A | 7/1992 | Wang et al. |
| 5,142,551 A * | 8/1992 | Borth et al. ............. 375/219 |
| 5,210,774 A | 5/1993 | Abbiate et al. |
| 5,278,780 A | 1/1994 | Eguchi |
| 5,311,546 A | 5/1994 | Paik et al. |
| 5,453,797 A | 9/1995 | Nicolas et al. |
| 5,471,508 A | 11/1995 | Koslov |
| 5,506,636 A | 4/1996 | Patel et al. |

(Continued)

FOREIGN PATENT DOCUMENTS

EP    0524559 B1    5/1997

(Continued)

OTHER PUBLICATIONS

Demodulation of Cochannel QAM Signals (continued); Error Detection/Correction; pp. 1-3, http://www.appsig.com/papers/1813f/813f_4.html.

(Continued)

*Primary Examiner*—Stephen Chin
*Assistant Examiner*—Ted M. Wang
(74) *Attorney, Agent, or Firm*—O'Shea Getz & Kosakowski P.C.

(57) ABSTRACT

A digital equalizer comprises a matched filter that, in conjunction with an FIR filter, assures a single peak with substantially greater energy than other peaks caused by ghosts, thereby permitting synchronization even with multiple, arbitrarily strong ghosts caused by strong multipathing, multiple transmitters, or both.

5 Claims, 6 Drawing Sheets

U.S. PATENT DOCUMENTS

| | | | |
|---|---|---|---|
| 5,508,752 A | 4/1996 | Kim et al. | |
| 5,532,750 A | 7/1996 | De Haan et al. | |
| 5,537,435 A | 7/1996 | Carney et al. | |
| 5,568,098 A | 10/1996 | Horie et al. | |
| 5,568,521 A | 10/1996 | Williams et al. | |
| 5,588,025 A | 12/1996 | Strolle et al. | |
| 5,619,154 A | 4/1997 | Strolle et al. | |
| 5,648,987 A | 7/1997 | Yang et al. | |
| 5,668,831 A | 9/1997 | Claydon et al. | |
| 5,692,014 A | 11/1997 | Basham et al. | |
| 5,757,855 A | 5/1998 | Strolle et al. | |
| 5,781,460 A | 7/1998 | Nguyen et al. | |
| 5,789,988 A | 8/1998 | Sasaki | |
| 5,802,461 A | 9/1998 | Gatherer | |
| 5,805,242 A | 9/1998 | Strolle et al. | |
| 5,828,705 A | 10/1998 | Kroeger et al. | |
| 5,835,532 A | 11/1998 | Strolle et al. | |
| 5,862,156 A | 1/1999 | Huszar et al. | |
| 5,870,433 A | 2/1999 | Huber et al. | |
| 5,872,817 A | 2/1999 | Wei | |
| 5,877,816 A * | 3/1999 | Kim | 348/526 |
| 5,894,334 A | 4/1999 | Strolle et al. | |
| 5,995,154 A | 11/1999 | Heimburger | |
| 6,005,640 A | 12/1999 | Strolle et al. | |
| 6,021,421 A * | 2/2000 | Retter et al. | 708/422 |
| 6,034,734 A | 3/2000 | De Haan et al. | |
| 6,034,998 A | 3/2000 | Takashi et al. | |
| 6,044,083 A | 3/2000 | Citta et al. | |
| 6,069,524 A | 5/2000 | Mycynek et al. | |
| 6,133,785 A | 10/2000 | Bourdeau | |
| 6,133,964 A | 10/2000 | Han | |
| 6,141,384 A | 10/2000 | Wittig et al. | |
| 6,145,114 A | 11/2000 | Crozier et al. | |
| 6,154,487 A | 11/2000 | Murai et al. | |
| 6,178,209 B1 | 1/2001 | Hulyalkar et al. | |
| 6,195,400 B1 | 2/2001 | Maeda | |
| 6,198,777 B1 | 3/2001 | Feher | |
| 6,219,379 B1 | 4/2001 | Ghosh | |
| 6,222,891 B1 | 4/2001 | Liu et al. | |
| 6,226,323 B1 | 5/2001 | Tan et al. | |
| 6,233,286 B1 | 5/2001 | Wei | |
| 6,240,133 B1 | 5/2001 | Sommer et al. | |
| 6,249,544 B1 | 6/2001 | Azazzi et al. | |
| 6,260,053 B1 | 7/2001 | Maulik et al. | |
| 6,272,173 B1 | 8/2001 | Hatamian | |
| 6,275,554 B1 | 8/2001 | Bouillet et al. | |
| 6,278,736 B1 | 8/2001 | De Haan et al. | |
| 6,304,614 B1 | 10/2001 | Abbaszadeh et al. | |
| 6,307,901 B1 | 10/2001 | Yu et al. | |
| 6,333,767 B1 | 12/2001 | Patel et al. | |
| 6,356,586 B1 | 3/2002 | Krishnamoorthy et al. | |
| 6,363,124 B1 | 3/2002 | Cochran | |
| 6,411,341 B1 | 6/2002 | De Haan et al. | |
| 6,411,659 B1 | 6/2002 | Liu et al. | |
| 6,415,002 B1 | 7/2002 | Edwards et al. | |
| 6,421,378 B1 | 7/2002 | Fukuoka et al. | |
| 6,438,164 B1 | 8/2002 | Tan et al. | |
| 6,452,639 B1 | 9/2002 | Wagner et al. | |
| 6,466,630 B1 | 10/2002 | Jensen | |
| 6,483,872 B1 | 11/2002 | Nguyen | |
| 6,490,007 B1 | 12/2002 | Bouillet et al. | |
| 6,493,409 B1 | 12/2002 | Lin et al. | |
| 6,507,626 B1 | 1/2003 | Limberg | |
| 6,535,553 B1 | 3/2003 | Limberg et al. | |
| 6,570,919 B1 * | 5/2003 | Lee | 375/233 |
| 6,573,948 B1 | 6/2003 | Limberg | |
| 6,611,555 B1 | 8/2003 | Smith et al. | |
| 6,665,695 B1 | 12/2003 | Brokish et al. | |
| 6,724,844 B1 | 4/2004 | Ghosh | |
| 6,734,920 B1 | 5/2004 | Ghosh et al. | |
| 2001/0048723 A1 | 12/2001 | Oh | |
| 2002/0024996 A1 | 2/2002 | Agazzi et al. | |
| 2002/0051498 A1 | 5/2002 | Thomas et al. | |
| 2002/0136329 A1 | 9/2002 | Liu et al. | |
| 2002/0154248 A1 | 10/2002 | Wittig et al. | |
| 2002/0172275 A1 | 11/2002 | Birru | |
| 2002/0172276 A1 | 11/2002 | Tan et al. | |
| 2002/0186762 A1 | 12/2002 | Xia et al. | |
| 2002/0191716 A1 | 12/2002 | Xia et al. | |
| 2003/0058967 A1 | 3/2003 | Lin et al. | |
| 2003/0206600 A1 | 11/2003 | Vankka | |
| 2004/0057538 A1 | 3/2004 | Sathiavageeswaran et al. | |

FOREIGN PATENT DOCUMENTS

| | | |
|---|---|---|
| EP | 0752185 B1 | 7/2002 |
| WO | WO 00/27033 | 5/2000 |
| WO | WO 00/27066 | 5/2000 |
| WO | WO 01/01650 A1 | 1/2001 |
| WO | WO 01/43310 A2 | 6/2001 |
| WO | WO 01/43384 A2 | 6/2001 |

OTHER PUBLICATIONS

Demodulation of Cochannel QAM Signals (continued); Simulation Results; pp. 1-6; http://www.appsig.com/papers/1813f/813f_5.html.

De Haan et al. "DeInterlacing-an Overview", Proceedings of the IEEE, vol. 86, No. 9, pp. 1837-1856 (Sep. 1998).

De Haan et al. "De-Interlacing of Video Data", IEEE Transactions on Consumer Electronics, vol. 43, No. 3, pp. 819-824 (Aug. 1997).

Wang et al. "Time-Recursive DeInterlacing for IDTV and Pyramid Coding", Elsevier Science Publishers B. V., vol. 2, No. 3, pp. 365-374 (Oct. 1990).

* cited by examiner

EQUALIZER FOR TIME DOMAIN SIGNAL PROCESSING

PRIORITY

This utility patent application claims priority from U.S. Provisional Patent Application No. 60/248,180, filed Nov. 13, 2000, the entire specification of which is hereby incorporated herein.

TECHNICAL FIELD OF THE INVENTION

The present invention generally relates to signal processing and, more particularly, to an equalizer for time domain signal processing.

BACKGROUND OF THE INVENTION

Equalizers are an important element in many diverse digital information applications, such as voice, data, and video communications. These applications employ a variety of transmission media. Although the various media have differing transmission characteristics, none of them is perfect. That is, every medium induces variation into the transmitted signal, such as frequency-dependent phase and amplitude distortion, multipath reception, other kinds of ghosting, such as voice echoes, and Rayleigh fading. In addition to channel distortion, virtually every sort of transmission also suffers from noise, such as additive white gausian noise ("AWGN"). Equalizers are therefore used as acoustic echo cancelers (for example in full-duplex speakerphones), video deghosters (for example in digital television or digital cable transmissions), signal conditioners for wireless modems and telephony, and other such applications.

Those skilled in the art will recognize that prior art equalizers have difficulty coping with ghosts having a signal strength close to that of the main signal. Typically ghosts are caused by multipathing—that is, portions of the transmitted signal that are reflected by one or more terrain features to arrive at the receiver by less direct paths. Consequently, ghosts are typically weaker, and arrive after, the main signal. However, in certain environments, especially downtown areas, which have numerous large buildings that can completely mask a signal, signal strength can be highly directional. A receiver positioned in the shadow of a tall building, for example, might not receive any direct signal, but still receive strong signals that are reflected off of one or more other buildings. Thus, in this environment, ghosts that are as strong as the "main" signal are possible. Furthermore, since the strength of the signal may be controlled as much by the albedo, size, or shape of the reflective surface as by the number of reflections in the path, ghosts that arrive before the strongest signal are far more likely.

Similar problems occur in systems that use multiple transmitters in order to provide the widest possible coverage for a digital transmission. Multiple transmitters would permit a wider area to be covered using less total broadcast power, and could help to fill in dark areas where the transmission from one transmitter may be blocked. Thus, using multiple transmitters can provide wider and more complete coverage for virtually any digital transmission. However, using multiple transmitters creates a serious problem when the receiver is at a "seam" between two transmitters, because the additional signal can appear as a "ghost" that can be as large as the "main" signal.

Those skilled in the art will appreciate that existing receiver technology handles ghosts by filtering them out in order to interpret the "main" signal. But in a multi-transmitter environment, or an area which generates multiple reflections and highly directional signals, this strategy is unworkable. It makes little sense to design a system to filter out a ghost that can be an arbitrarily large fraction of the "main" signal's size. Near the margins the best this subtractive strategy can ever provide is a signal strength equal to the strongest single echo—the energy from the secondary signals, whether from reflections or additional transmitters, is wasted.

In short, in a multi-transmitter or downtown environments the "main" signal becomes a meaningless concept. In order to operate efficiently in such a multi-signal environment, a digital receiver must operate with a different paradigm. What is needed is a digital receiver that employs an additive strategy—that is, one in which the energy from one or more relatively large ghosts can be captured and used to aid in the synchronization process, rather than filtered out and discarded. Such a receiver could both function with ghosts 100% of the size of the "main" signal, and provides substantially superior performance whenever ghosts exceed about 70% of the size of the "main" signal.

Figure 1:
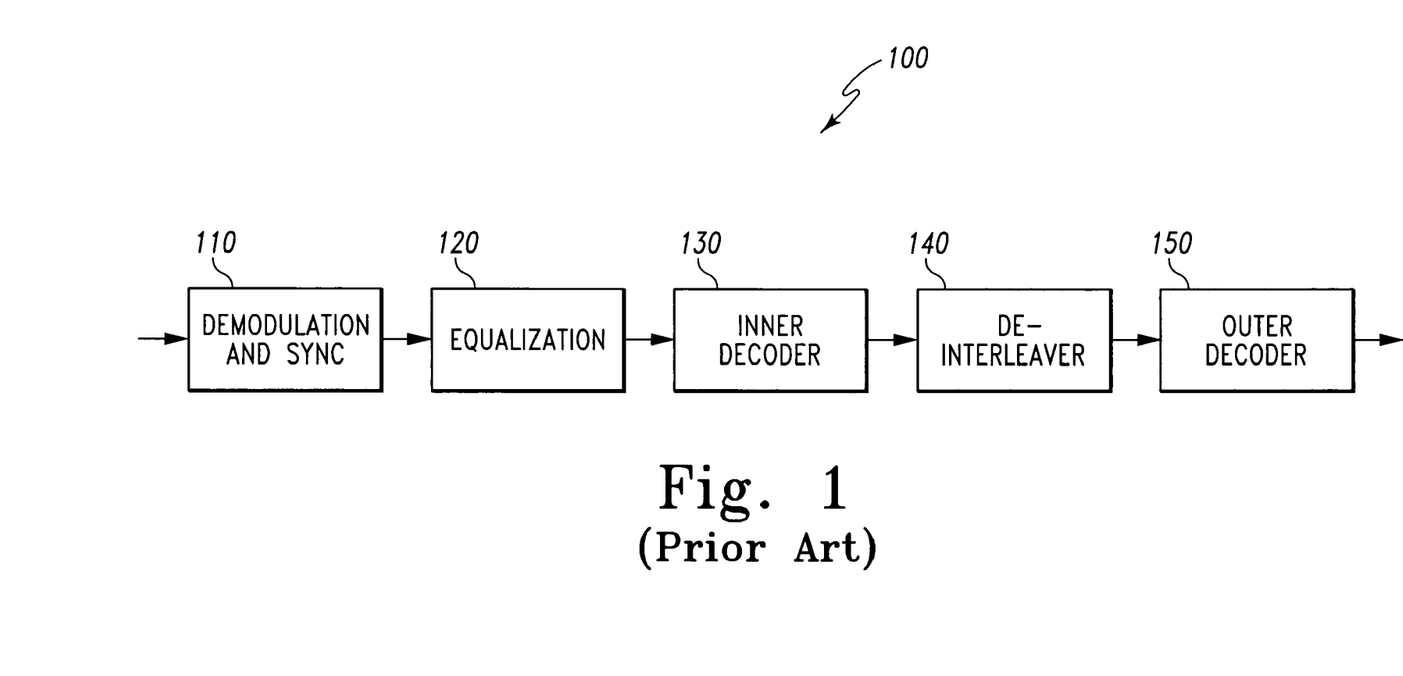
FIG. 1 is a block diagram of certain elements of prior art digital receivers.

FIG. 1 illustrates a block diagram of a typical digital communication receiver, including channel coding and equalization, indicated generally at 100. The receiver 100 comprises a demodulation and sync component 110, which converts the received analog signal back into a digital format. The receiver 100 further comprises an equalizer 120, an inner decoder 130, a de-interleaver 140, and an outer decoder 150. The inner coding is typically convolutional coding, while the outer coding is typically block coding, most often Reed-Solomon coding. The convolutional and block coding are generally combined in order to exploit the complementary advantages of each.

Figure 2:
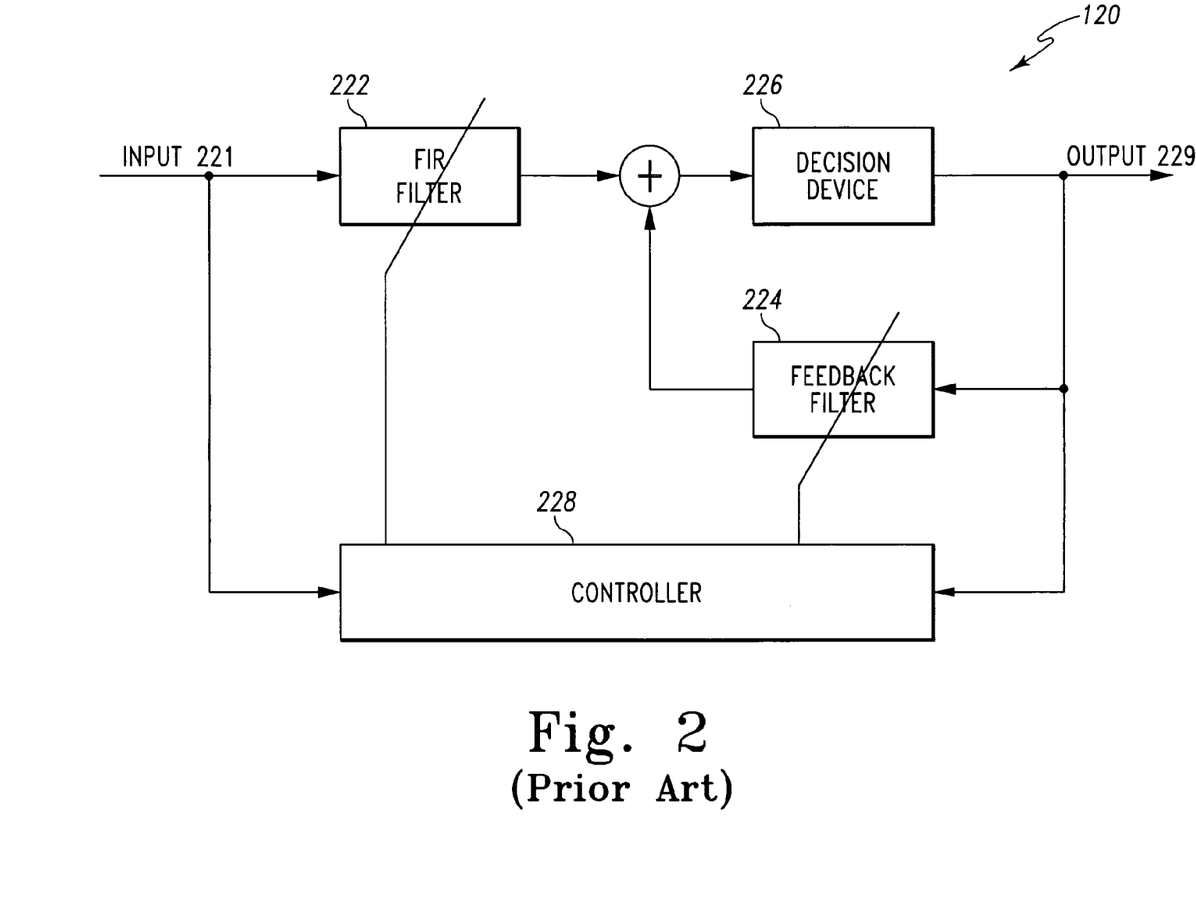
FIG. 2 is a block diagram of certain elements of prior art digital equalizers suitable for use in digital receivers such as that of FIG. 1.

FIG. 2 is a diagram of an equalizer 120 such as is commonly used in the digital receiver 100 shown in FIG. 1. Typically, the equalizer 120 includes a controller 228, a finite impulse response ("FIR") filter 222, a decision device 226, and a decision feedback equalizer ("DFE") 224. The FIR filter 222 receives the input signal 221. The FIR filter 222 is used to cancel pre-ghosts—that is, ghost signals that arrive before the main transmission signal. The decision device 226 examines its inputs and makes a decision as to which one of the received signals at its input is the signal to be transmitted to the output 229. The input to the decision device 226 is modified by a decision feedback equalizer 224, which is used to cancel post-ghosts—that is, ghost signals that arrive after the main transmission signal—and the residual signal generated by the FIR filter 222.

The decision device 226 is typically a hard decision device, such as a slicer. For example, in an 8VSB system, the slicer can be a decision device based upon the received signal magnitude, with decision values of 0, ±2, ±4, and ±6, in order to sort the input into symbols corresponding to the normalized signal values of ±1, ±3, ±5, and ±7. For another example, the slicer can be multi-dimensional, such as those used in quadrature amplitude modulation ("QAM") systems.

The controller 228 receives the input data and the output data and generates filter coefficients for both the FIR filter 222 and the decision feedback filter 224. Those skilled in the art will appreciate that there are numerous methods suitable for generating these coefficients, including LMS and RLS algorithms.

Figure 4:
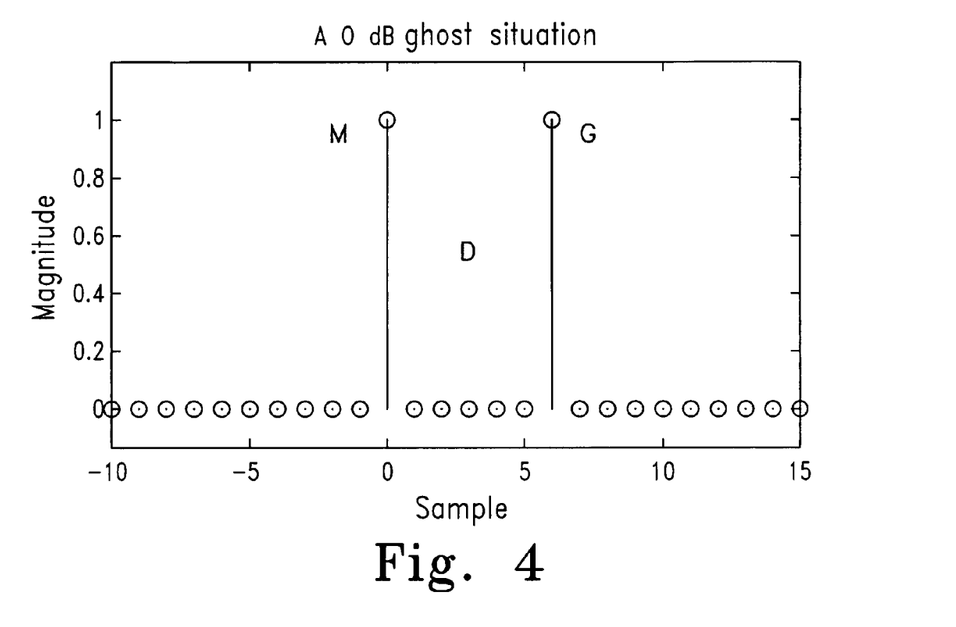
FIG. 4 is a graph of signal magnitude versus time showing a 100% post-ghost situation.

FIG. 4 is a graph of signal magnitude versus time illustrating a post ghost having a magnitude 100% of the "main"

signal. The main transmission signal M is illustrated at a relative magnitude of 1 (0 dB). After a time delay of D, a 100% post-ghost signal G arrives. In this situation, the prior art equalizer 120 of FIG. 2 has difficulty selecting the "main" signal for the proper output 229—since the very concept of a "main" signal is meaningless with a 100% ghost. If the ghost signal G is treated as a pre-ghost, then the FIR filter 222 will have tap values equal to 1 and will go infinite. If the ghost signal G is treated as a post-ghost, then the error of the feedback filter 224 will be magnified and the filter becomes unstable. Further, if the ghost G changes magnitude due to its phase variation or channel variation, the main signal M and the ghost signal G can exchange roles (based upon maximum magnitude).

Therefore, what is needed is an equalizer that is better adapted to cope with ghosts having an arbitrarily large magnitude relative to the main signal, including the possibility of a "ghost" having a magnitude that can temporarily exceed the magnitude of the "main" signal. The present invention is directed towards meeting these needs, as well as providing other advantages over prior equalizers.

SUMMARY OF THE INVENTION

A first embodiment digital equalizer according to the present invention comprises: a matched filter; an FIR filter connected to the matched filter; a decision device connected to the FIR filter; a feedback filter connected to decision device; and a controller connected to the matched filter, the FIR filter, and the feedback filter.

A second embodiment digital equalizer according to the present invention comprises: a matched filter; an FIR filter connected to the matched filter; a decision device connected to the FIR filter; a feedback filter connected to decision device; and a controller connected to the matched filter, the FIR filter, and the feedback filter. The matched filter has a response equal to a channel response of a channel used to transmit a received signal. The feedback filter is substantially shorter than the FIR filter. The channel response is determined using a test sequence contained in the transmitted signal. The equalizer synchronizes with a synthesized signal constructed by the composite function of the channel response of a channel used to transmit a received signal and itself.

DETAILED DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

A preferred embodiment digital equalizer according to the present invention deals effectively with ghosts of any magnitude. Furthermore, it uses an additive paradigm which permits energy from all ghosts to contribute to the signal used by the equalizer. Thus, the preferred embodiment equalizer can synchronize even with multiple, arbitrarily strong ghosts caused by severe multipathing, multiple transmitters, or both.

Figure 3:
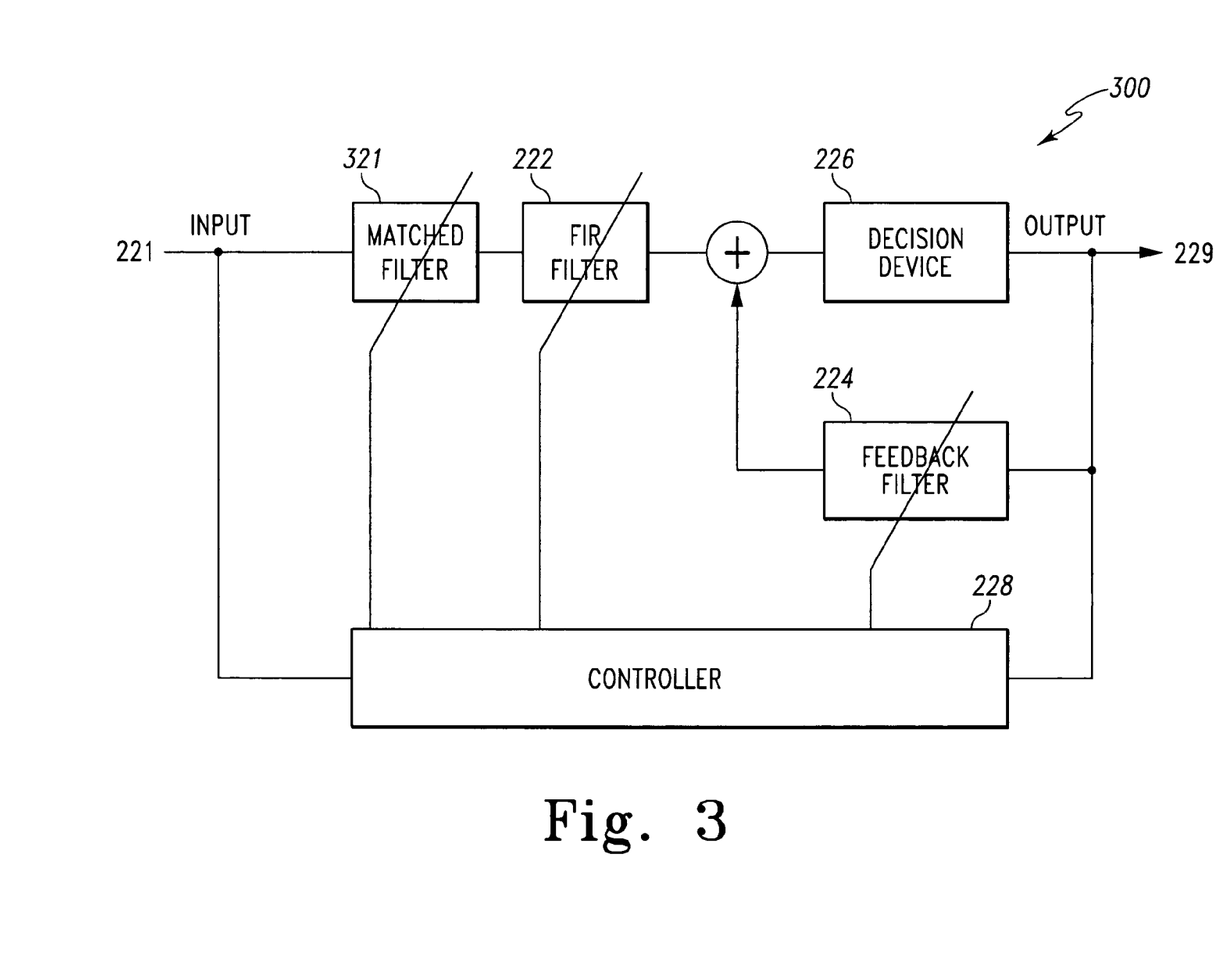
FIG. 3 is a block diagram of certain elements of a digital equalizer according to the present invention.

FIG. 3 is a block diagram showing certain elements of a preferred embodiment time-domain digital equalizer according to the present invention, indicated generally at 300. The preferred embodiment equalizer 300 is similar to the prior art equalizer 120, and includes the same components shown in FIG. 2. However, in the equalizer 300 an extra linear filter 321, called a "matched" filter, is inserted at the input 221. The controller 228 generates the tap coefficients for the matched filter 321, in addition to those for the FIR filter 222 and the decision feedback filter 224. The matched filter 321 acts as a pre-channel filter. Pre-channel filters have a response that is the complex conjugate of the channel response, which is a representation of the transmission medium characteristic between the transmitter and the receiver. Those skilled in the art will appreciate that the transmission medium can be space (satellite broadcasts), air (terrestrial broadcast), or via a transmission cable (e.g. cable TV). The channel response is defined as the impulse response of the transmission medium. Ideally, the channel response should be flat across the frequency band of interest; however, the channel response can be distorted due to mutipath flat fading, reflections, or both.

The coefficients of the pre-channel filter 321 can be obtained from analysis of the transmission channel, such as the result of the correlation of a known training sequence. As is known in the art, in some transmission systems, such as the one used for terrestrial digital television broadcasting, training sequences are inserted into the data stream to assist receivers in synchronization, equalization, and initialization. A commonly used sequence is a maximum length pseudo random PN sequence. For example, in a terrestrial digital television broadcasting system (e.g. ATSC, 8-VSB), a 511 bit binary PN sequence is inserted every 313 segments (24 ms). An autocorrelation between this known sequence and the received sequence will generate the channel impulse response, which is used to construct the filter taps for the matched filter 321.

Figure 5A:
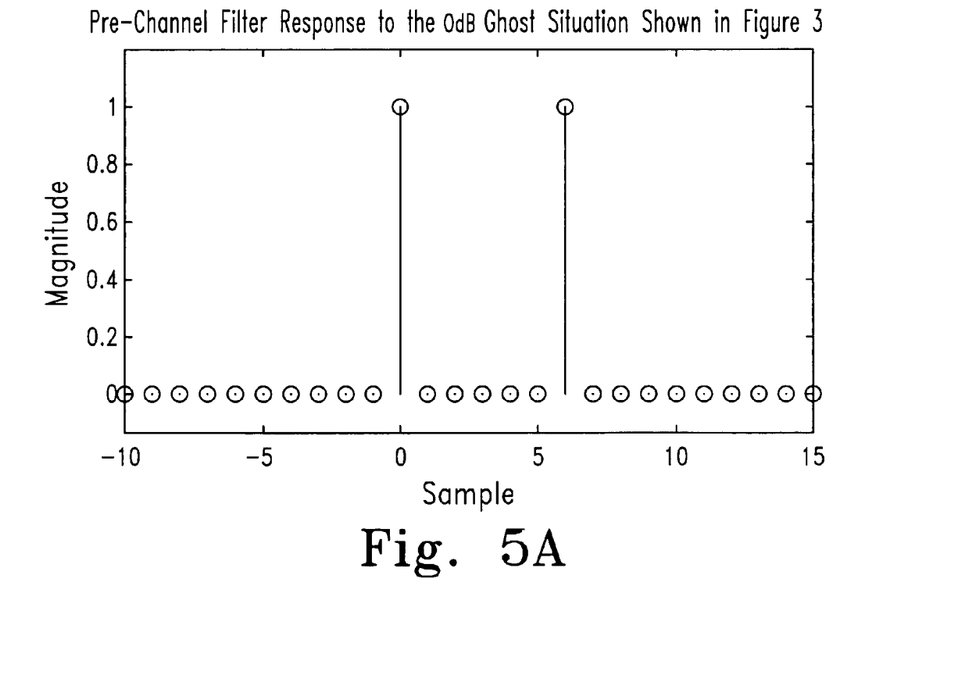
FIG. 5A is a graph of tap coefficients for a pre-channel filter for the signal response shown in FIG. 4.
Figure 5B:
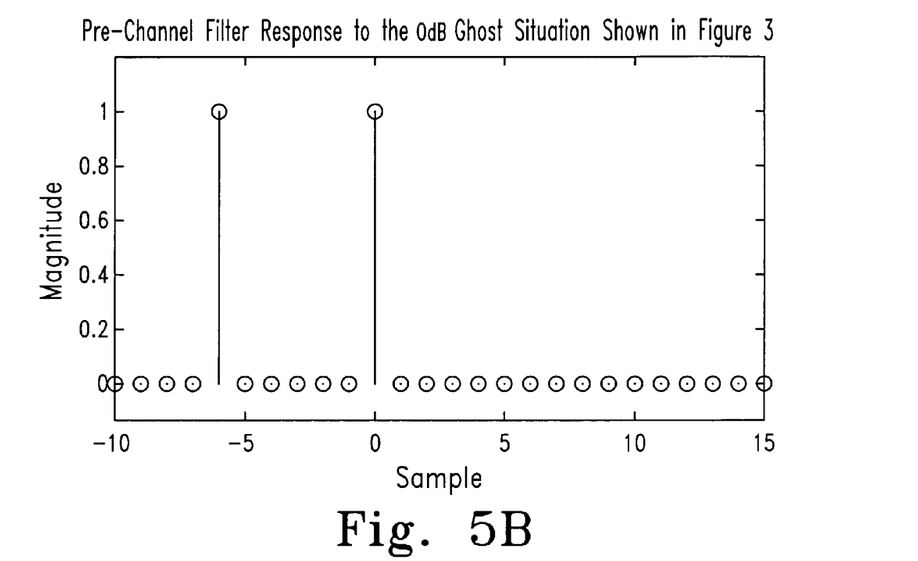
FIG. 5B is a graph of tap coefficients for a matched filter that has a response equivalent to the channel response shown in FIG. 4.

Under the 0 dB ghost situation shown in FIG. 4, the main signal M and a delayed version of this signal (Ghost G) with the same magnitude are added together with a delay of D. The pre-channel filter 321 should have a response that is the complex conjugate of the transmission channel and, therefore, it has tap values as shown in FIG. 5B. However, because in an 8VSB system the signal is simple in the time domain, the pre-channel filter 321 can have a response identical to the transmission channel, and the result will be correct except for a delay. Consequently, the pre-channel filter 321 may also have tap values as shown in FIG. 5A.

Figure 6:
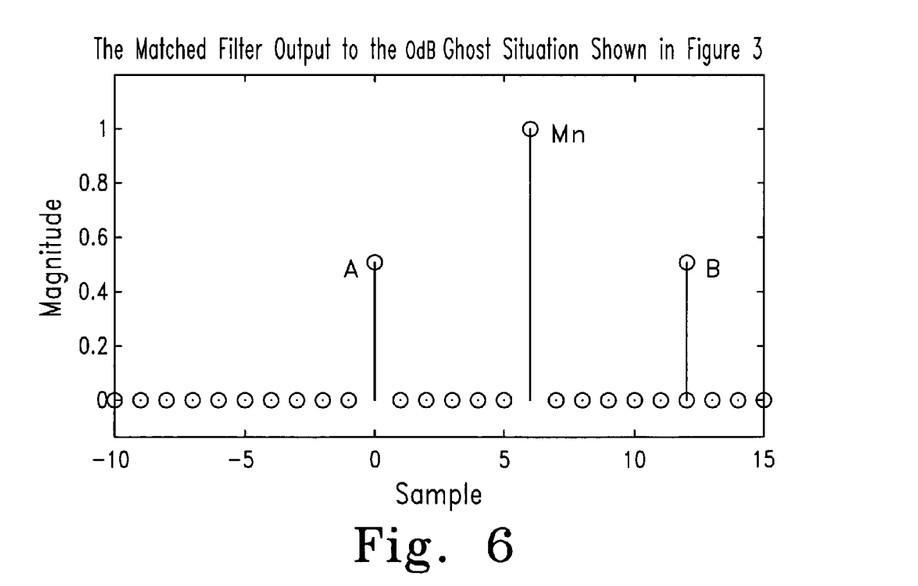
FIG. 6 is a graph of the signal magnitude output from the matched filter shown in FIG. 5B and the FIR filter.

The output from a matched filter 321 having tap values shown in FIG. 5B is shown in FIG. 6. FIG. 6 shows that the 0 dB ghost signal G has been turned into a pair of ghosts A and B whose signal strength is much less than 0 dB. It will also be noted that the peak signal value Mn is now at sample point 6 instead of sample point 0, as in FIG. 4. This offset is the consequence of using filter taps corresponding to the channel response, rather than its complex conjugate. But regardless of the linear offset, this peak location is where the system will now lock onto. The system will not attempt to lock onto either the main signal M or the ghost signal G. In the equalizer 300, the largest peak is treated as the main signal. With the pre-channel filter 321 present in the equalizer 300 a single peak Mn, and only one peak, is guaranteed.

It will be appreciated that, using the inventive equalizer of FIG. 3, the peak signal Mn contains contributions from the original main signal M and all of the ghost signals—the equalizer uses an additive paradigm for synchronization. Thus, using such a newly generated main signal will significantly increase the system equalization performance when there are strong ghosts, since all useful signal power from those ghosts is used. Furthermore, the equalizer 300 will not switch its main tap if a ghost temporarily exceeds the magnitude of the strongest signal, as is the case with the prior art equalizer 120, because it uses the newly generated peak as the main signal. The strongest peak in the newly generated signal will remain the strongest signal regardless of fluctuations in the magnitudes of the ghosts that contribute energy to it.

Another benefit of the inventive equalizer 300 is that, so long as there are fewer than 3 signals near 100% of the strongest signal, no single ghost greater than 50% (~3 dB) will exist and, as a result, the convergence speed, stability, and accuracy of the equalizer 300 are all greatly improved. As the system 300 locks onto the newly generated peak signal Mn, the peak location will not change regardless of the magnitude variation in the main signal or the ghost signals.

It will be appreciated that, in order to simplify the hardware design, the pre-channel filter 321 and the FIR filter 222 may be combined.

It is desirable that the FIR filter 222 be longer than the feedback filter 224. As shown in FIG. 6, the new main signal Mn is at sample point 6, which is the central position between the original main signal M and the ghosted signal B. In other words, the new generated main signal Mn has moved toward the middle of the entire channel response, and therefore, there should be enough taps for the FIR filter 222 to cancel the newly generated pre-ghost A. The center tap (the location of the newly generated main signal Mn) should be near the center so that ghosts on both sides can be effectively removed. It should be pointed out that the number of taps used for the FIR filter 222 and the feedback filter 224 do not need to be identical, but the FIR filter 222 should be longer than the feedback filter 224. This is different than most prior art equalizer designs, since in those equalizers the FIR filter 222 is significantly shorter than the feedback filter 224, usually by a ratio of between 4:1 and 10:1.

The FIR filter 222 is used to cancel any interference before the main peak Mn after the pre-channel filter 321. The ideal solution which totally eliminates inter-symbol interference ("ISI") caused by mulitpathing requires the FIR filter 222 to be infinitely long. In this case, only noise enhancement is present after the FIR filtering and no ISI remains after the FIR filtering. However, an approximation can be done so that the FIR filter 222 has shortened length and, as a result, there will be some amount of ISI left after the FIR filtering, but a trade off between ISI and noise enhancement can be done for the optimum results. In other words, in a practical system, a certain amount of ISI can be allowed in exchange for smaller noise enhancement. Therefore an optimum system has limited length of an FIR filter 222 and trades off between ISI residual and noise enhancement.

The feedback filter 224 is used to cancel any interference after the main peak Mn. The interference signal after the main peak Mn comes after the FIR filter 222 has filtered the signal coming out from the pre-channel filter 321.

Figure 7:
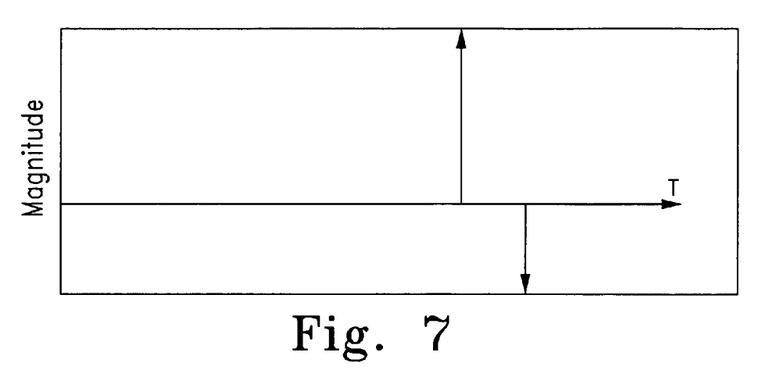
FIG. 7 is a graph showing the theoretical output after ideal FIR filtering.

FIG. 7 is a graph of the envelope of the equalizer taps vs. time showing the theoretical output after ideal FIR filtering. There is only noise enhancement and no ISI present.

Figure 8:
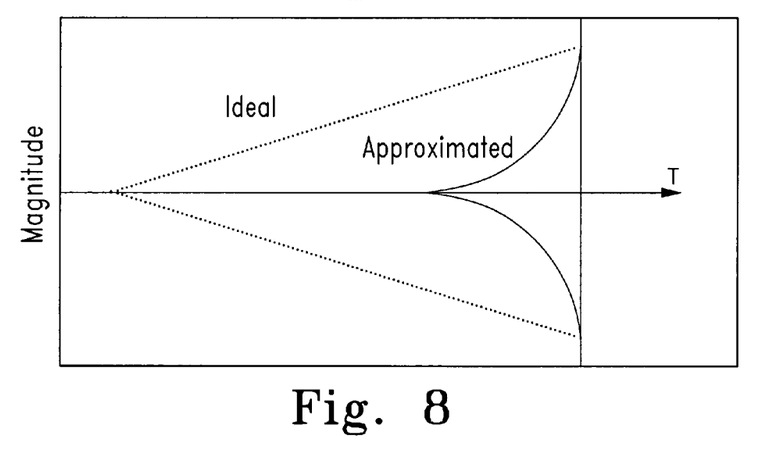
FIG. 8 is a graph showing the envelop of the taps of the FIR filter under both ideal and approximated conditions.

FIG. 8 is a graph showing the envelope of the taps of the FIR filter 222 under both ideal and approximated conditions. The ideal solution goes to infinite, while the approximated solution is much shorter. The small arrows indicate the residual ISI; this is tolerable since a small amount of ISI can simply be treated as noise. Also, the ideal solution has a linearly decreasing slope while the optimum approximated solution has an exponentially decreasing slope.

Figure 9:
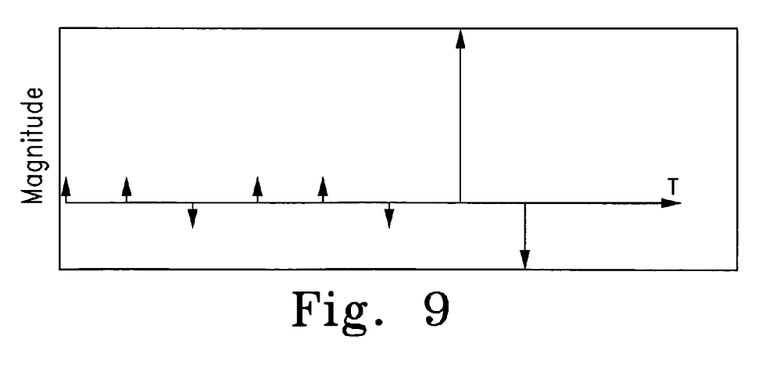
FIG. 9 is a graph showing the output after the approximated FIR filtering.

FIG. 9 is a graph showing the output after the approximated FIR filtering. There are both ISI and noise enhancement components present.

While the invention has been illustrated and described in detail in the drawings and foregoing description, the same is to be considered as illustrative and not restrictive in character. Only the preferred embodiment, and certain alternative embodiments deemed useful for further illuminating the preferred embodiment, has been shown and described. All changes and modifications that come within the spirit of the invention are desired to be protected.

We claim:

1. A digital equalizer comprising:
    a matched filter that receives an input signal and provides a matched filter output signal;
    a FIR filter that receives and filters the matched filter output signal and provides a filtered output signal;
    a decision device that receives and processes a decision signal and provides a decision device output signal;
    a feedback filter that receives the decision device output signal and provides a feedback filtered signal;
    a summing device that computes the difference between the feedback filtered signal and the filtered output signal and provides the decision signal as indicative thereof; and
    a controller connected to the matched filter, the FIR filter, and the feedback filter,
    where the number of taps in the FIR filter is greater than the number of taps in the feedback filter.

2. The digital equalizer of claim 1, wherein the matched filter has a response equal to a channel response of a channel used to transmit a received signal.

3. The digital equalizer of claim 1, wherein the matched filter has a response equal to the complex conjugate of a channel response of a channel used to transmit a received signal.

4. The digital equalizer of claim 1, wherein a channel response is determined using a test sequence contained in a transmitted signal.

5. A digital equalizer comprising:
a matched filter having a response equal to a channel response of a channel used to transmit a received signal;
an FIR filter connected to the matched filter;
a decision device connected to the FIR filter;
a feedback filter that has less filter taps than the FIR filter and that is connected to the decision device;
a controller connected to the matched filter, the FIR filter, and the feedback filter;
wherein the channel response is determined using a test sequence contained in the transmitted signal; and wherein the digital equalizer synchronizes with a synthesized signal constructed by a composite function of the channel response of a channel used to transmit a received signal and itself.

* * * * *